Figure 1:
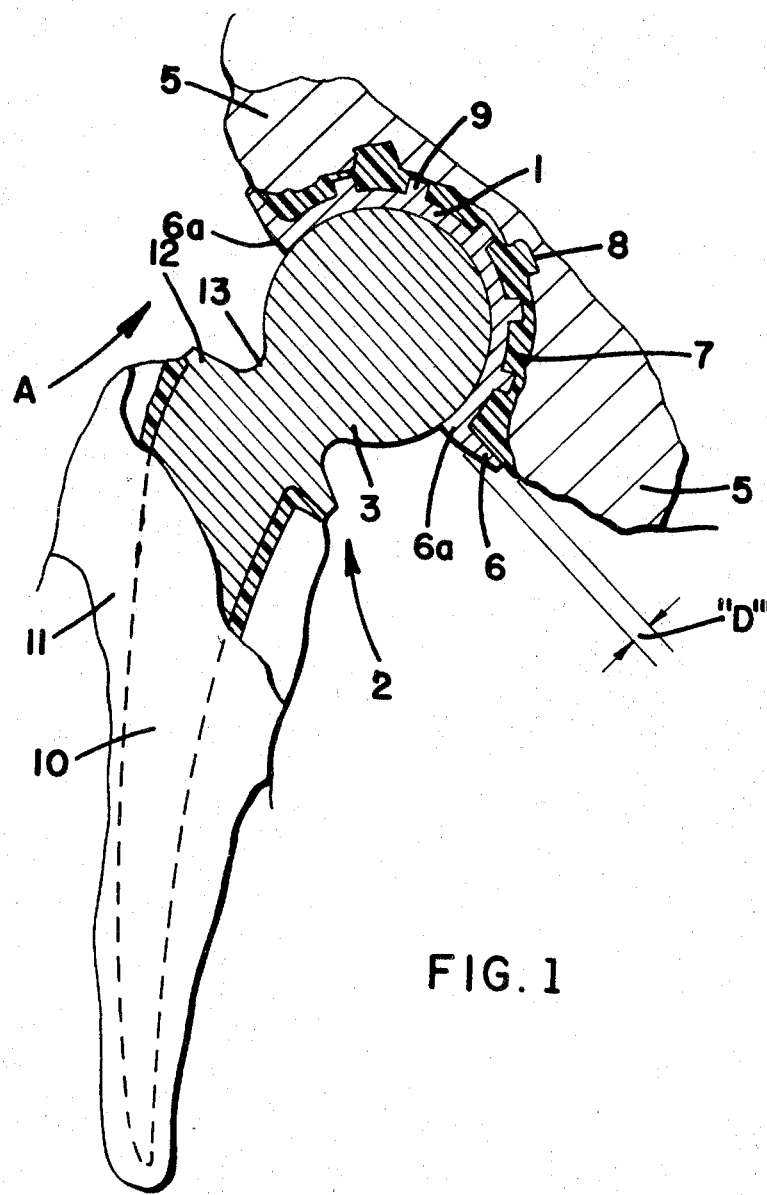

United States Patent
Chambers

[15] 3,656,184
[45] Apr. 18, 1972

[54] ARTIFICIAL HIP JOINT
[72] Inventor: Harold Victor Chambers, R.R. 7, Brantford, Ontario, Canada
[22] Filed: Mar. 10, 1970
[21] Appl. No.: 18,267

[30] Foreign Application Priority Data
    Mar. 13, 1969  Canada..................................045,568

[52] U.S. Cl. .................3/1, 128/92 C, 128/92 CA, 287/87
[51] Int. Cl. ..........................................................A61f 1/24
[58] Field of Search ..................3/1; 128/92 R, 92 C, 92 CA, 128/92 F; 287/87, DIG. 10, DIG. 13; 29/149.5 B

[56] References Cited

UNITED STATES PATENTS 3,003,399  10/1961  Donner..............................287/87 X

FOREIGN PATENTS OR APPLICATIONS 1,047,640  7/1953  France.................................128/92 C
192,639  11/1937  Switzerland............................287/87

*Primary Examiner*—Richard A. Gaudet
*Assistant Examiner*—Ronald L. Frinks
*Attorney*—Stevens, Davis, Miller & Mosher

[57] ABSTRACT

An artificial hip joint comprising a socket member and an inter-fitting ball member, in which dislocation of the joint is positively prevented by retaining means forming part of the socket member. The retaining means are constituted by extensions of the socket member beyond its diametral plane which define an opening into the socket smaller than that of the socket at the diametral plane. The ball member is shaped to pass through the socket opening at one particular orientation, for fitting the parts together, but once in place and orientated in normal positions of use the ball member cannot be removed from the socket.

9 Claims, 4 Drawing Figures

ARTIFICIAL HIP JOINT

The present invention relates to an artificial hip joint, also known as a hip joint prosthesis.

The artificial hip joint of this invention is intended as a replacement for both parts of the human hip joint. The natural hip joint consists of a ball-like member at the head of the femur or thigh-bone, this member being rotatable in a socket, termed the acetabulum, in the pelvis. When this joint becomes damaged or diseased, it is the practice to replace the femur head with a prosthesis including a ball member attached to the femur by a neck, and to fit a corresponding artificial socket member into the acetabulum, which may be suitably enlarged for the purpose.

In early artificial hip joints, the ball member rested in a socket of hemi-spherical form, and no special retaining means was provided for preventing dislocation of the joint, i.e. for preventing the ball member from being pulled out of the socket. In later designs a separate retaining ring has been used, having an inner surface which is a continuation of the hemi-spherical inner surface of the socket, and which is attachable for example by screws to the outer rim of the socket after the ball is positioned therein, to prevent subsequent dislocation. Such a design is shown in U.S. Pat. No. 3,067,740.

The present invention provides an improved artificial hip joint in which dislocation of the joint is positively prevented, but which avoids the use of a separate retaining ring.

In the hip joint prosthesis of the present invention, the inner surface of the socket member has a main substantially hemi-spherical portion terminating in a diametral plane, and extensions of said main portion form retaining means for the ball member, said retaining means defining an opening into the socket having an area smaller than that of the socket at the said diametral plane. The ball member has a mainly spherical surface fitting snugly within the said socket, the ball member having a diametral area greater than that of said socket opening whereby the ball member is normally retained in the socket by the retaining means. The otherwise spherical surface of the ball member is, however, relieved at a selected area or areas so that one diametral plane of the ball member is shaped and dimensioned to pass through the said socket opening, whereby with particular orientation of the ball member with respect to the socket said ball can be fitted into the socket.

In a preferred form of the invention, the socket opening defined by the retaining means is non-circular. In this case the otherwise spherical surface of the ball member is so relieved that in one diametral plane the ball member has a non-circular shape corresponding to that of the socket opening, and dimensioned to fit therein. In this form of the invention, the ball member can only be fitted into or removed from the socket when the shaped diametral plane of the ball is aligned with the opening into the socket member, and also when the ball is rotated in said diametral plane until the non-circular shape at that diametral plane is aligned with the shape of the opening. The non-circular shape of the opening is preferably of elliptical or oval form, and the major diameter thereof may be equal to the internal diameter of the socket at the diametral plane.

Before the hip joint is implanted into a patient, the joint is assembled by insertion of the ball member into the socket, and before final positioning and fixing of the hip joint the socket is adjusted in such manner that the patient's leg cannot be placed in any position which would allow dislocation of the joint. Thus while the joint can readily be assembled or disassembled before it is implanted, once it is implanted dislocation is virtually impossible, due to the natural restraints on the positions which a patient's leg can assume.

The hip joint is much simpler to make than known non-dislocating hip joints, because the retaining means can be formed integrally with the main part of the socket, and do not have to be provided for by a separate removable ring.

In the preferred form of the invention therefore, the retaining means is integral with the socket, and is provided by an annular extension of the socket beyond the diametral plane thereof referred to.

Figure 2:
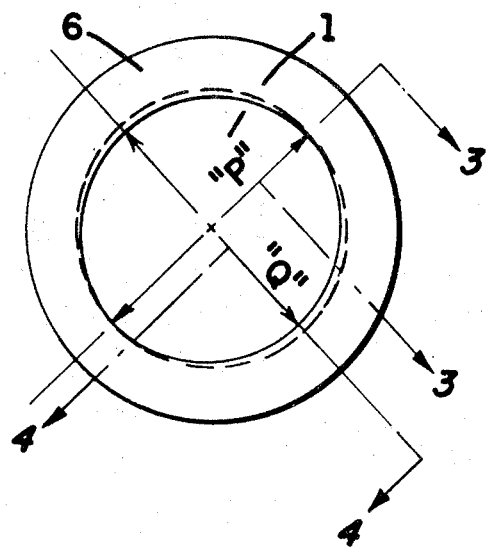
Figure 3:
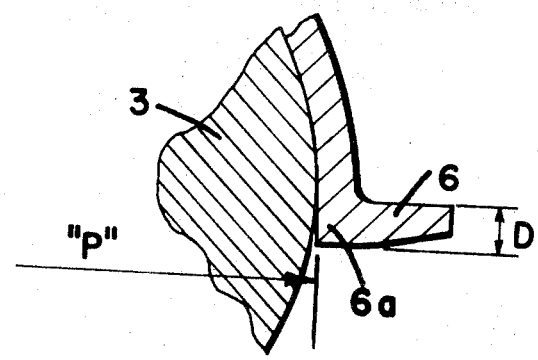
Figure 4:
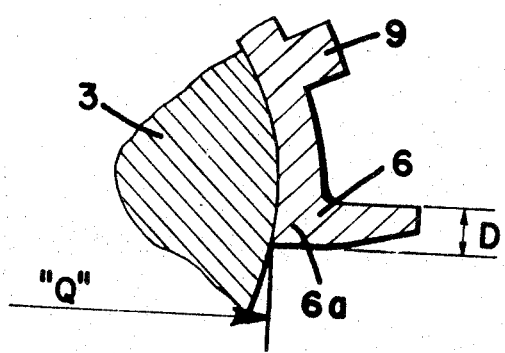

A preferred form of artificial hip joint in accordance with the invention will now be described by way of example with reference to the accompanying drawings, in which:

FIG. 1 is a partly sectioned elevation of the complete joint;

FIG. 2 shows the socket member alone viewed from the direction of arrow "A" in FIG. 1; and FIGS. 3 and 4 are enlarged fragmentary cross-sectional views of the assembly taken on lines corresponding respectively to lines 3—3 and 4—4 of FIG. 2.

As shown in FIG. 1, the joint comprises two co-operating main parts, namely a socket member 1 for fitting into a pelvis, and a femural head prosthesis 2 including a ball member 3 rotatable in said socket.

The socket member 1 is shown positioned in the acetabulum of the pelvis indicated at 5. The socket 1 is of cup-like form having an encircling flange 6 and having a generally hemi-spherical outer surface suitable for positioning and fixing within the acetabulum. The socket is held in place in the acetabulum by plastic cement indicated at 7, which cement engages in drilled-out recesses 8 in the acetabulum and also engages on ribs 9 which are integral with the socket 1, these recesses 8 and ribs 9 giving good keying of the cement to both socket and acetabulum. If required, the cement may also be secured with screws. This manner of fixing the socket is generally in accordance with known practice.

The inner surface of the socket member has a main substantially hemi-spherical portion terminating at a diametral plane, which plane coincides with the inner face of the flange 6. Beyond this diametral plane an annulus 6a is provided, integral with the main part of the socket member and occupying the same width "D" as the flange 6. This annulus provides extensions to the inner surface of the socket which terminate in an oval opening shown in FIG. 2. This oval opening has a major diameter "P" equal to the inside diameter of the socket at the diametral plane, the circular form of which is indicated ghosted in FIG. 2, and a minor diameter "Q". The inner surface of the annulus 6a is shaped to provide a smooth transition from the oval outer opening to the circular diametral plane.

The oval opening into the socket is preferably elliptical, but may also be a shape formed by two circular arcs having off-set centers.

FIGS. 3 and 4 show the cross-sectional shape of the extensions provided for by annulus 6a at respectively the major and minor diameters of the elliptical opening. At the cross-section shown in FIG. 3, the annulus presents a straight-sided inner surface. At the cross-section of FIG. 4, the shape of the internal surface of the annulus is a continuation of the circular shape of the socket cross-section, and follows the spherical shape of the ball member 3. The cross-sections at intermediate angular positions will be intermediate in shape between the shapes shown in FIGS. 3 and 4.

The femural head prosthesis 2 co-operating with the socket member 1 as described has a shank 10 suitably shaped to be driven into and secured by plastic cement in the central axis of the femur indicated at 11, after removal of the defective femural head. A collar 12 is provided for locating on the upper end of the femur, and the shank 10 and collar 12 are connected to the ball member 3 by a neck 13.

Many different forms of shank are known for femural head prosthesis to suit different conditions of femur, and the fitting and securing of such shanks to the femur is an established surgical technique which will not be further described. Also, in some circumstances the ball member 3 could be provided with a shank means in the form of a sleeve member instead of a solid stem for engaging around the upper end of the femur, such an arrangement being also known in the art.

The ball member 3 is generally spherical and fits closely within the socket with a very small clearance of about 0.001 inches. The clearance is small enough to ensure that the diameter of the ball is larger than the minor diameter of the elliptical opening into the socket, so that once correctly in position the ball member cannot be removed except as described hereinafter. Since the clearance between the ball member and the socket is so small, it will be clear that the ball member can effectively be retained in the socket member by the retaining means provided for by annulus 6a even where this annulus extends by a distance "D" which is quite small in relation to the diameter of the ball member. In the embodiment shown, the dimension "D" is considerably less than one fifth of the diameter of the ball member.

To allow for insertion or removal of the ball member into the socket, the otherwise spherical surface of the ball is relieved, for example by grinding or machining, so that at one selected diametral plane the cross-section is an ellipse of such dimensions as to fit within the elliptical opening of the socket. Clearly, the ball can only be inserted in the socket if the selected elliptical plane of the ball is aligned with the plane of the elliptical opening of the socket, and further if the major and minor axes of the elliptical plane of the ball and the elliptical opening also coincide. After the ball has been inserted as described, the ball member is rotated to an operative position, at which dislocation is prevented by interference between the retaining means constituted by annulus 6a and the spherical surface of the ball.

It may be noted that, before insertion into a patient, the ball member is free to rotate within the socket member about the axis of the shank 10, the only restriction on this rotation occurring after the hip joint has been implanted, when this rotation is of course restricted by natural restraints on the patient's leg.

The relationship of the selected elliptical plane of the ball to the plane of the socket opening is chosen so that when the hip joint is implanted such planes can rarely or never coincide. Furthermore, the orientation of the major and minor axes of the two elliptical parts may be suitably offset by rotation of the socket member before fixing to the pelvis to further reduce the chances of the parts becoming suitably orientated for dislocation of the joint once the joint is implanted.

The socket and ball members may be made of stainless steel, titanium, or Stellite Alloy No. 21. The latter alloy is a standard alloy containing cobalt as the base material, with 27 percent chromium, 2.8 percent nickel, and 5.5 percent molybdenum. The ball and socket may be made in various standard sizes, but generally the diameter of the ball will be about 1.5 inches.

The invention may take other forms not involving non-circular socket openings. For example, the socket opening may be circular but of smaller diameter than the internal diameter of the socket at the diametral plane. In this case the ball member would be relieved to present a short cylindrical surface portion surrounding one circumference of the ball and capable of fitting within this opening. In this case, however, dislocation would only require that the appropriate diametral planes of the ball and socket be aligned, so that there is less certain protection against dislocation than with the preferred design using a non-circular socket opening.

Other designs can also easily be envisaged using non-circular socket openings. Thus one simple form of the invention would be a socket having an extension beyond the diametral plane on one side thereof only, the inner surface of said extension having the same curvature as the main inner surface of the socket, this socket co-operating with a ball member having a flat formed on one side thereof such as to allow the ball to be inserted into the socket when the flat is aligned with the said extension. Alternatively, use could be made of a socket member having an inner surface of spherical shape and subtending more than the surface of a hemi-sphere, but in which the outer edges of the socket are cut back on the slant to the diametral plane on opposite sides so as to produce a non-circular opening of oval form, the ball having one diametral plane which is correspondingly shaped to fit into said opening.

I claim:

1. A hip joint prosthesis comprising a socket member for insertion into the acetabulum of a pelvis, and a femoral head prosthesis including a ball member rotatable in said socket member and shank means for securing said ball member to a femur, said socket member being of cup-like form having a generally hemi-spherical outer surface suitable for positioning and for being retained in the acetabulum, said socket member having an inner surface including a main substantially hemi-spherical portion terminating in a diametral plane and in which extension of said main portion form retaining means for the ball member, said retaining means defining an opening into the socket having an area smaller than that of the socket member at the said diametral plane, and in which said ball member has a mainly spherical surface fitting closely within said socket member, said ball member having a diametral area greater than that of the opening into the socket member whereby the ball member is normally held in the socket member by said retaining means, and the otherwise spherical surface of the ball member being relieved so that one diametral plane of said ball member is shaped and dimensioned to pass through said socket member opening, whereby with particular orientation of the ball member with respect to the socket member the ball member can be fitted into the socket member, said ball member being free to rotate within said socket member about the axis of said shank means except when implanted in a patient and thus restricted by natural restraints on the patients leg.

2. A hip joint prosthesis according to claim 1, wherein said socket opening is circular, and wherein said ball member is relieved so as to present a cylindrical surface surrounding one circumference of the ball member and dimensioned to pass through the socket member opening.

3. A hip joint prosthesis according to claim 1, wherein said retaining means are formed integrally with the socket member.

4. A hip joint prosthesis according to claim 1, wherein said hemi-spherical portion of the socket member has an extension in the form of an integral annulus extending beyond said diametral plane of the socket member, parts of said annulus constituting the said retaining means.

5. A hip joint prosthesis comprising a socket member for insertion into the acetabulum of a pelvis, and a femoral head prosthesis including a ball member rotatable in said socket member and shank means for securing said ball member to a femur, said socket member being of cup-like form having a generally hemi-spherical outer surface suitable for positioning and for being retained in the acetabulum, said socket member having an inner surface including a main substantially hemi-spherical portion terminating in a diametral plane and in which extensions of said main portion form retaining means for said ball member, said retaining means defining a non-circular opening into said socket member having an area smaller than that of the socket member at the diametral plane, and in which said ball member has a mainly spherical surface fitting closely within said socket member, said ball member having a diameter greater than the smallest diameter of said non-circular opening whereby the ball member is normally retained in said socket member by said retaining means, and the otherwise spherical surface of the ball member being relieved so that one diametral plane of said ball member is shaped and dimensioned to pass through said non-circular opening, whereby with particular orientation of the ball member with respect to the socket member said ball member can be fitted into said socket member, said ball member being free to rotate within said socket member about the axis of said shank means except when implanted in a patient and thus restricted by natural restraints on the patient's leg.

6. A hip joint prosthesis according to claim 5, in which said retaining means are formed integrally with the socket member.

7. A hip joint prosthesis according to claim 5, wherein said hemi-spherical portion of the socket member has an extension in the form of an integral annulus surrounding said diametral plane of the socket member, parts of said annulus constituting the said retaining means.

8. A hip joint prosthesis according to claim 5, wherein the non-circular opening has its major diameter at least as large as the internal diameter of the socket member at the diametral plane.

9. A hip joint prosthesis according to claim 5, wherein the non-circular opening defined in the socket member is oval, having a major diameter equal to the internal diameter of the socket at the diametral plane, and wherein the said diametral plane of the ball member is similarly shaped and is dimensioned to fit within said opening.

* * * * *